US010223938B2

(12) United States Patent
Bostick et al.

(10) Patent No.: US 10,223,938 B2
(45) Date of Patent: Mar. 5, 2019

(54) GENERATING A THREE-DIMENSIONAL REPRESENTATION OF A TOPOGRAPHY

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/995,700

(22) Filed: Jun. 1, 2018

(65) Prior Publication Data
US 2018/0315349 A1 Nov. 1, 2018

Related U.S. Application Data

(63) Continuation of application No. 14/537,287, filed on Nov. 10, 2014, now Pat. No. 10,083,633.

(51) Int. Cl.
*G09B 29/12* (2006.01)
*G09B 5/02* (2006.01)
(52) U.S. Cl.
CPC .............. *G09B 29/12* (2013.01); *G09B 5/02* (2013.01)
(58) Field of Classification Search
CPC ....... G06F 3/016; G09B 19/00; G09B 21/003; G09B 21/004; G09B 25/06; G09B 21/12;
(Continued)

(56) References Cited

U.S. PATENT DOCUMENTS 4,390,491 A 6/1983 Woodall
6,502,032 B1 * 12/2002 Newman .............. G09B 21/003
345/156
(Continued)

FOREIGN PATENT DOCUMENTS

WO 2014071081 A2 5/2014

OTHER PUBLICATIONS

U.S. Appl. No. 14/180,587—Office Action dated Apr. 10, 2015.
U.S. Appl. No. 14/316,834—Final Office Action dated Nov. 5, 2015.
U.S. Appl. No. 14/316,834—Office Action dated Jul. 30, 2015.
P. Mell et al., "The NIST Definition of Cloud Computing", National Institute of Standards and Technology, Information Technology Laboratory, Special Publication 800-145, Sep. 2011, pp. 1-7.
(Continued)

*Primary Examiner* — Jerry-Daryl Fletcher
(74) *Attorney, Agent, or Firm* — Law Office of Jim Boice

(57) ABSTRACT

A three-dimensional topography representation generating hardware device includes a frame and a plurality of movable pins. A converting logic converts a topographic map of a first region of a physical topography into a set of commands to individually control each of the plurality of movable pins, wherein each of the plurality of movable pins is selectively movable based on distances between contour lines in each pair of contour lines from the contour lines in order to create a three-dimensional representation of the first region of the physical topography based on the topographic map. A position device identifies a current location of the three-dimensional topography representation generating hardware device. A visual cue generator generates a visual cue on the three-dimensional representation of the first region of the physical topography, wherein the visual cue identifies the current location of the three-dimensional topography representation generating hardware device.

19 Claims, 10 Drawing Sheets

(58) Field of Classification Search
CPC ....... G06T 11/206; G06T 17/05; G06T 19/00; H01H 2215/00
See application file for complete search history.

(56) References Cited

U.S. PATENT DOCUMENTS

| | | |
|---|---|---|
| 7,291,364 B2 | 11/2007 | Faulkner et al. |
| 7,352,356 B2 | 4/2008 | Roberts et al. |
| 7,403,191 B2 | 7/2008 | Sinclair |
| 7,864,161 B2 | 1/2011 | Hollemans et al. |
| 8,203,537 B2 | 6/2012 | Tanabe et al. |
| 8,232,976 B2 | 7/2012 | Yun et al. |
| 8,368,566 B2 | 2/2013 | Higa |
| 8,593,409 B1 | 11/2013 | Heubel et al. |
| 2006/0075356 A1 | 4/2006 | Faulkner |
| 2009/0132093 A1 | 5/2009 | Arneson et al. |
| 2009/0220923 A1 | 9/2009 | Smith |
| 2011/0157080 A1 | 6/2011 | Ciesla et al. |
| 2011/0216013 A1 | 9/2011 | Siotis |
| 2011/0304550 A1 | 12/2011 | Romera Jolliff et al. |
| 2012/0105333 A1 | 5/2012 | Maschmeyer et al. |
| 2012/0218254 A1 | 8/2012 | Abeln |
| 2012/0280920 A1 | 11/2012 | Jackson et al. |
| 2013/0155020 A1 | 6/2013 | Heubel et al. |
| 2013/0181946 A1 | 7/2013 | Lee |
| 2015/0077398 A1 | 3/2015 | Yairi et al. |

OTHER PUBLICATIONS

Jillian D'Onfro, "This Insane Technology That Makes Buttons Appear on a Flat Smartphone Screen is Pretty Close to Magic", Business Insider, Inc., businessinsider.com, Jan. 9, 2014, pp. 1-3.
R. Schwartz et al., "IBM 5 in 5 2012: Touch: You will be able to touch through your phone", IBM Research, ibmresearchnews.blogspot.com, Dec. 17, 2012, pp. 1-4.
A. Goswick, "Touch Meets Texture ... Electronically with TeslaTouch!", DizFanatic.com, DizTech vol. 9, retrieved Nov. 10, 2014, pp. 1-2.
S. Cooper, "Tactus morphing touchscreen keyboard hands-on (with video)", AOL, Inc., engadget.com, Jan. 8, 2013, pp. 1-3.
List of IBM Patents or Patent Applications Treated as Related, Jun. 1, 2018.
NIST, "NIST 'Pins' Down Imaging System for the Blind", last updated Oct. 5, 2010, retrieved Aug. 7, 2014, 1 page.
Anonymous, "3D Print Your Trek, In Color!" www.instructables.com, retrieved Nov. 10, 2014, pp. 1-29.
T. Sekitani et al., "Stretchable Active-Matrix Organic Light-Emitting Diode Display Using Printable Elastic Conductors", Macmillan Publishers Limited, Nature Materials, vol. 8, May 10, 2009, pp. 494-499.
D. Griner, "Your Life-Size Chance to Press the Flesh", Adweek.com, The Adfreak Daily Newsletter, Aug. 21, 2007, 1 page.

\* cited by examiner

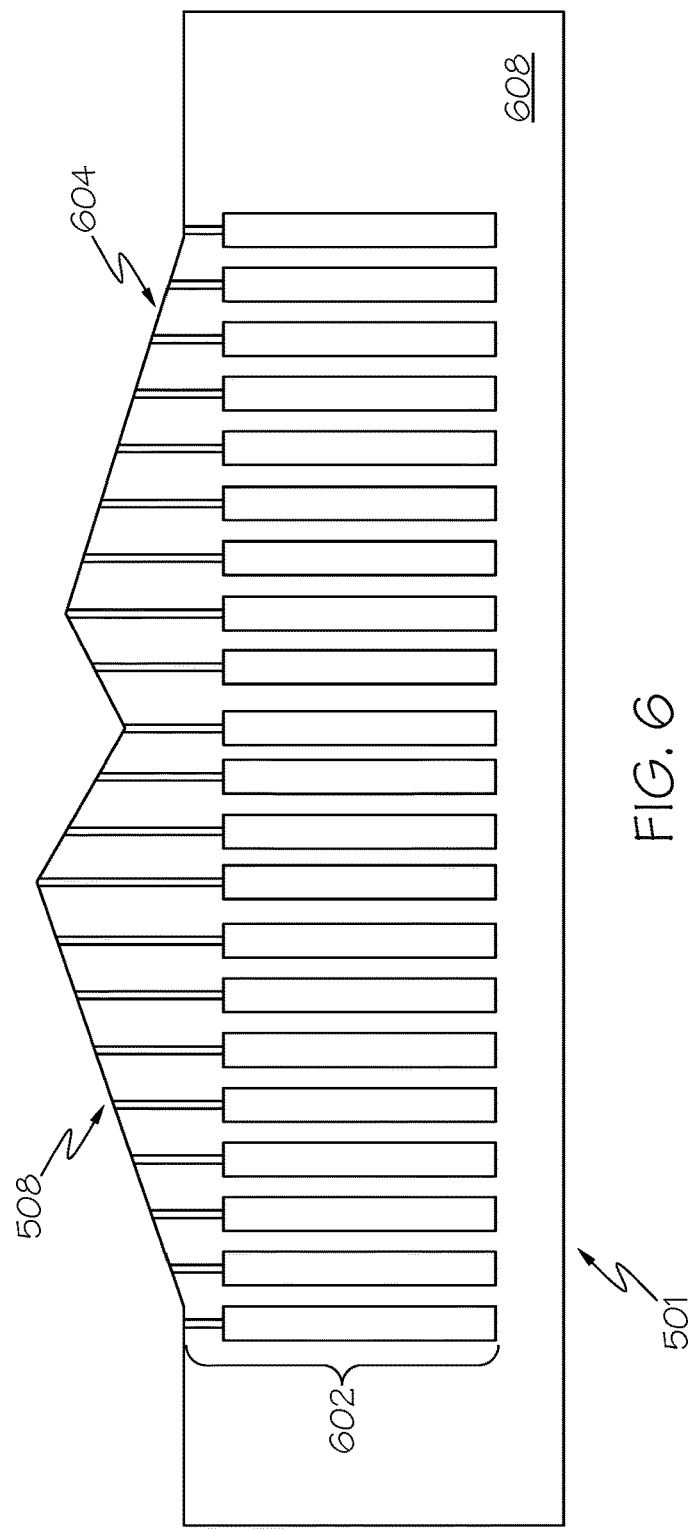

GENERATING A THREE-DIMENSIONAL REPRESENTATION OF A TOPOGRAPHY

BACKGROUND

The present disclosure relates to the field of topography, and in particular to the field of topographic maps. Still more particularly, the present invention is related to generating three-dimensional topographical representations of topography.

As used herein, the term "topography" is a description of the shape and dimension of any region of land. That is, a topography is a description of elevation changes, riverbeds, cliffs, etc. that define the shape of a particular piece of land. A topographic map is a two-dimensional map of a region. A topographic map includes contour lines, which describe changes of elevation on the mapped area. If contour lines are close together, this indicates a sharp change in elevation. If contour lines are far apart, this indicates a relatively more gradual change in elevation.

SUMMARY

In one embodiment of the present invention, a three-dimensional topography representation generating hardware device includes a frame and a plurality of movable pins. A converting logic converts a topographic map of a first region of a physical topography into a set of commands to individually control each of the plurality of movable pins, wherein each of the plurality of movable pins is selectively movable based on distances between contour lines in each pair of contour lines from the contour lines in order to create a three-dimensional representation of the first region of the physical topography based on the topographic map. A position device identifies a current location of the three-dimensional topography representation generating hardware device. A visual cue generator generates a visual cue on the three-dimensional representation of the first region of the physical topography, wherein the visual cue identifies the current location of the three-dimensional topography representation generating hardware device.

In one embodiment of the present invention, a method and/or computer program product generates a three dimensional representation of a topographic map. A three-dimensional topography representation generating hardware device receives a topographic map of a first region of a physical topography, wherein the topographic map comprises contour lines that represent changes in elevation within the first region of the physical topography. The topographic map of the region of the physical topography is converted into a set of commands to individually control each of a plurality of movable pins within a frame, wherein each of the plurality of movable pins is selectively movable to create a three-dimensional representation of the first region of the physical topography based on the topographic map. A predefined location on the three-dimensional representation of the first region of the physical topography is identified. A visual cue on the three-dimensional representation of the first region of the physical topography is generated, where the visual cue identifies the predefined location on the three-dimensional representation of the first region of the physical topography.

BRIEF DESCRIPTION OF THE DRAWINGS

FIG. 6 illustrates a side-view of a three-dimensional topography representation generating hardware device in accordance with one or more embodiments of the present invention;

DETAILED DESCRIPTION

Figure 1:
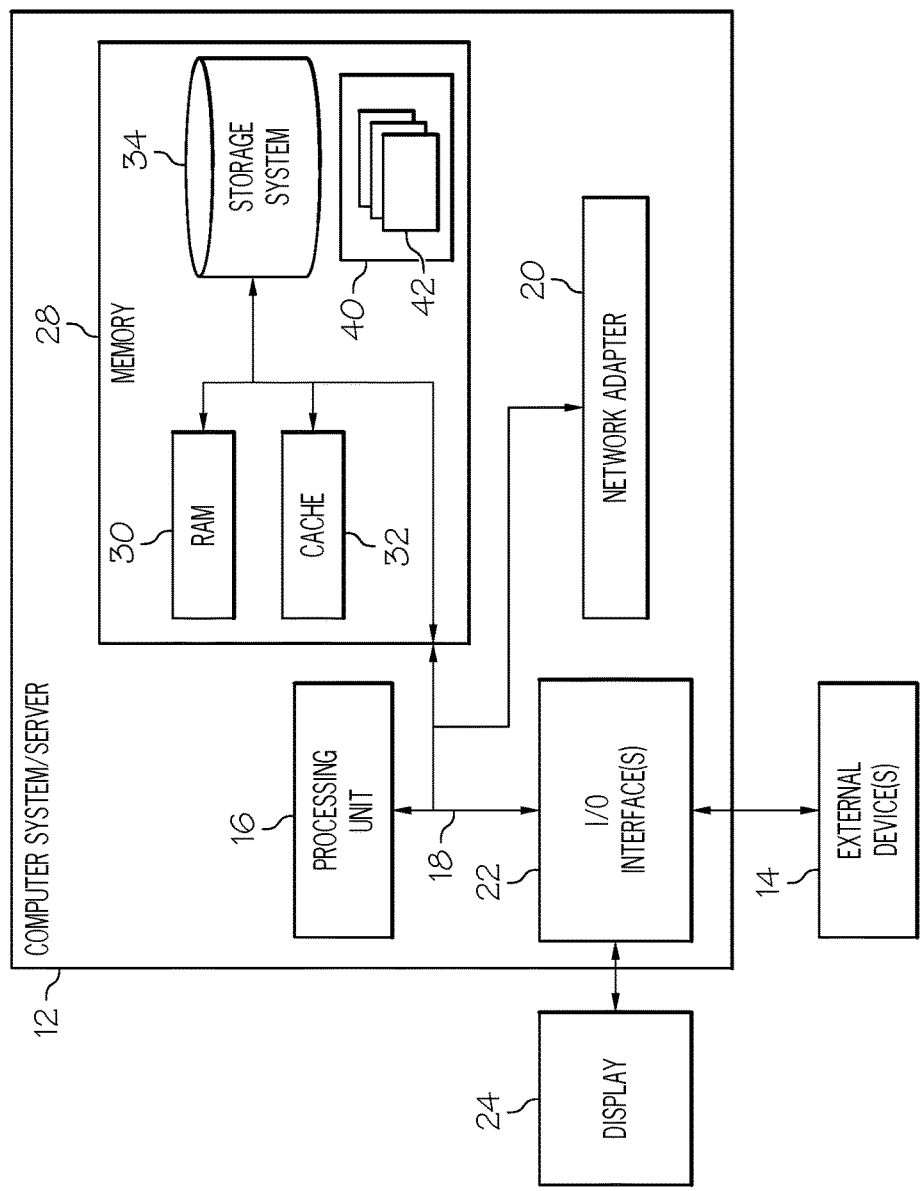
FIG. 1 depicts a cloud computing node according to an embodiment of the present invention.

In one or more embodiments, the present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
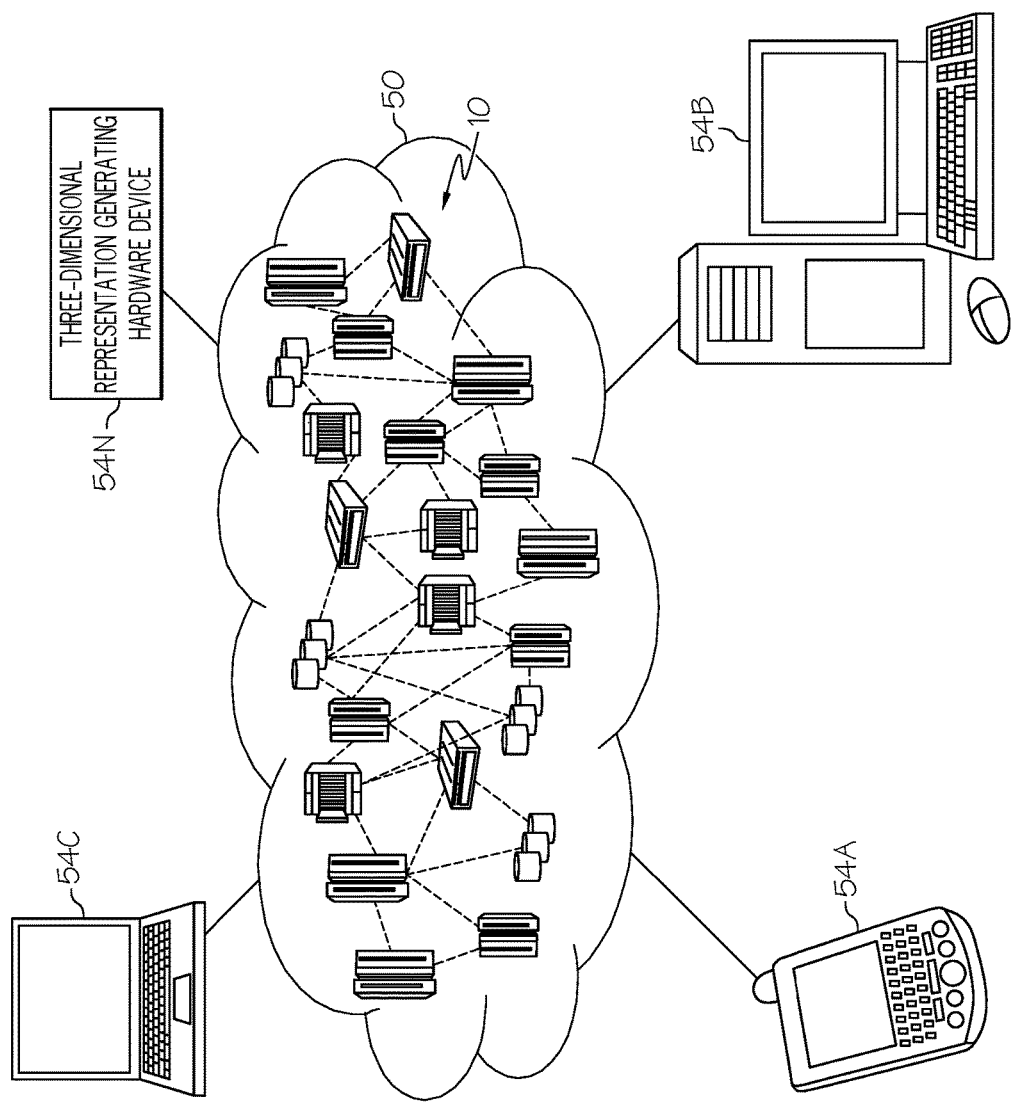
FIG. 2 illustrates a cloud computing environment according to an embodiment of the present invention.
Figure 4:
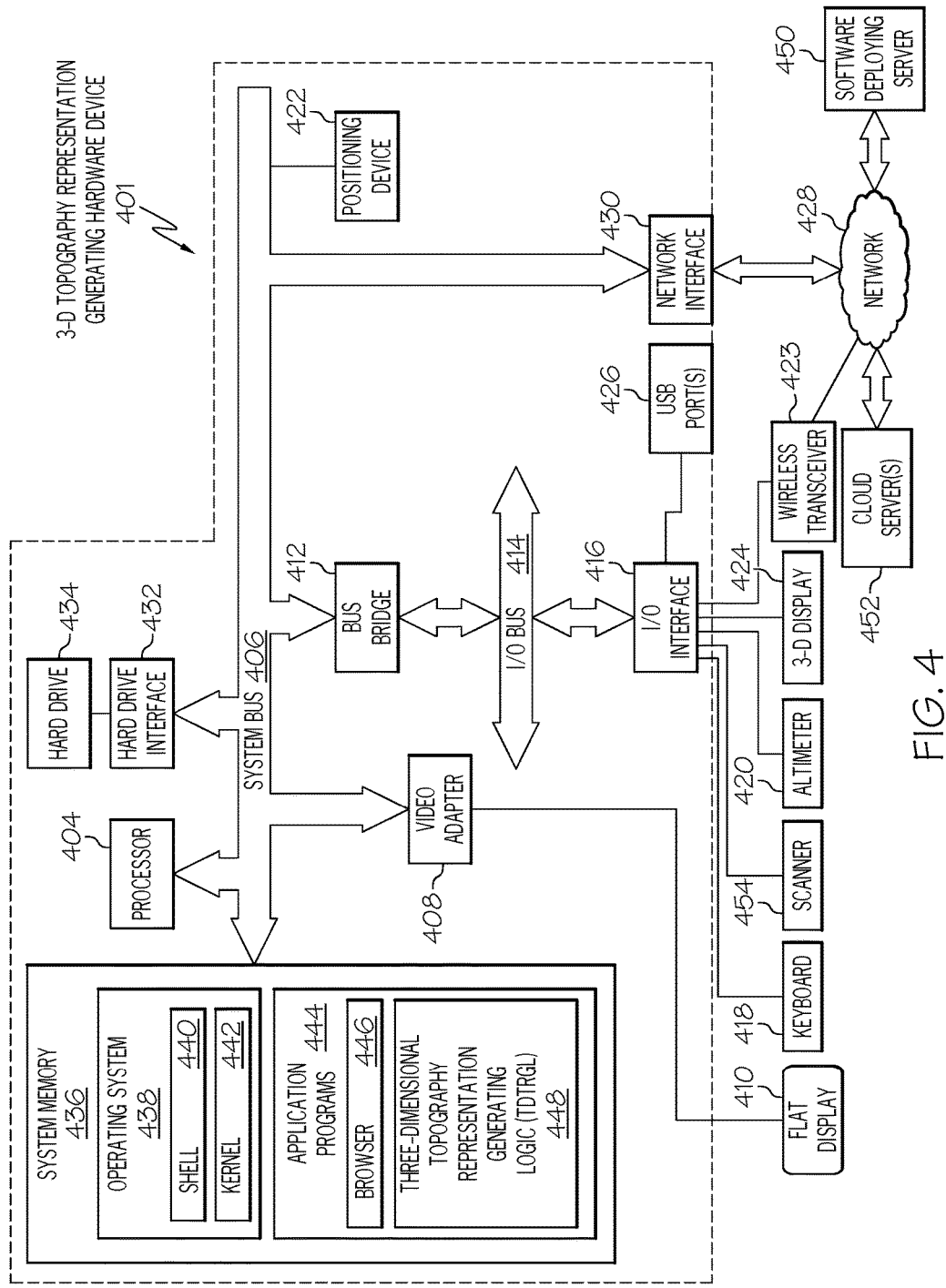
FIG. 4 illustrates an exemplary architecture of a three-dimensional topography representation generating hardware device in according with one or more embodiments of the present invention.
Figure 5:
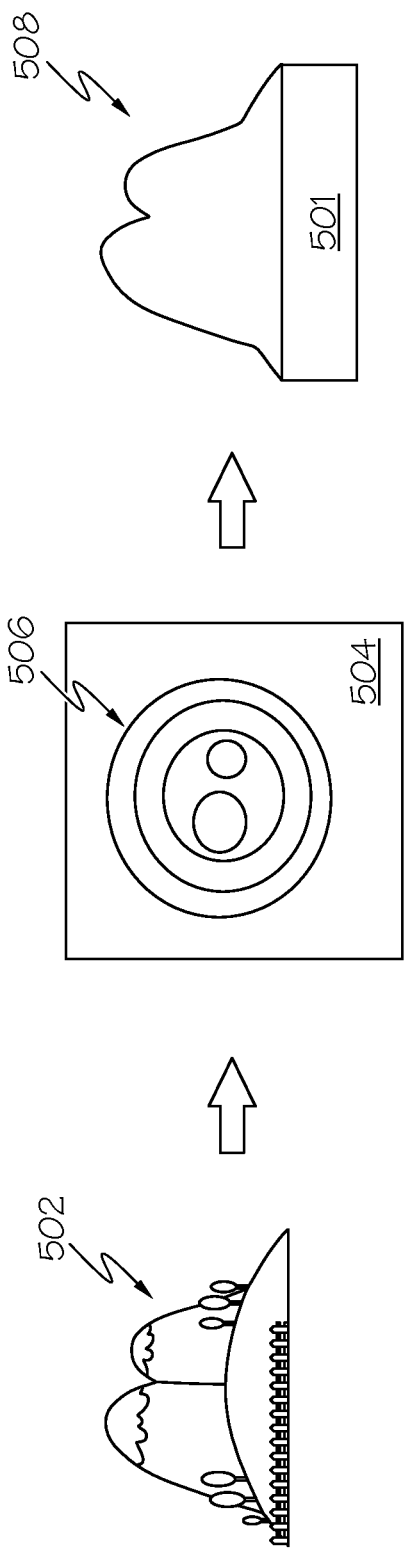
FIG. 5 depicts an exemplary physical topography being transformed into a two-dimensional topographic map, and then into a three-dimensional representation of the original physical topography.
Figure 9:
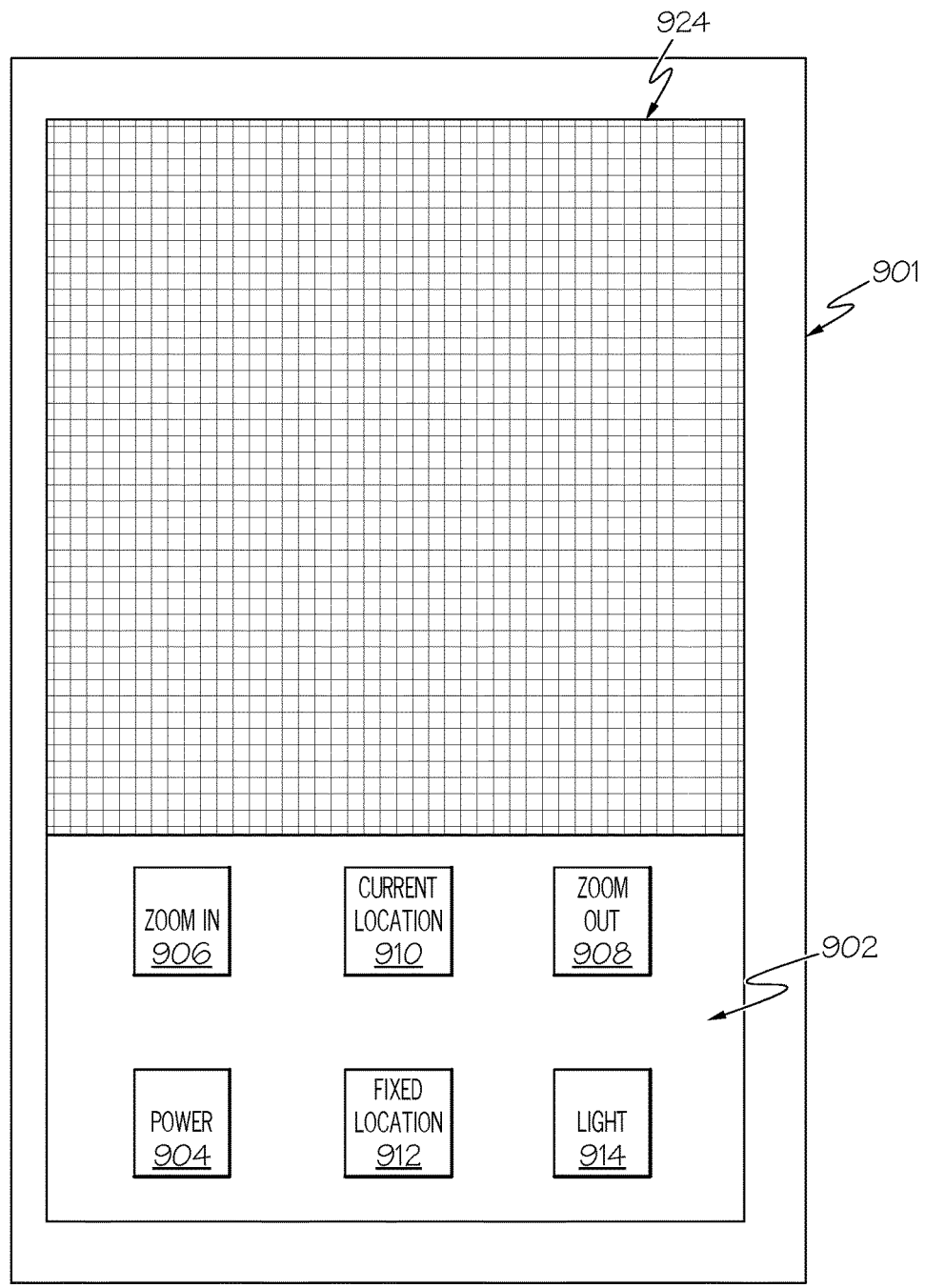
FIG. 9 depicts a top view of the three-dimensional topography representation generating hardware device illustrated in FIG. 5 and FIG. 6.

In one or more embodiments of the present invention, external devices 14 include the three-dimensional topography representation generating hardware device 54N depicted in FIG. 2, the three-dimensional topography representation generating hardware device 401 depicted in FIG. 4, the three-dimensional topography representation generating hardware device 501 depicted in FIG. 5, the three-dimensional topography representation generating hardware device 601 depicted in FIG. 6, and/or the three-dimensional topography representation generating hardware device 901 depicted in FIG. 9.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or three-dimensional topography representation generating hardware device 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
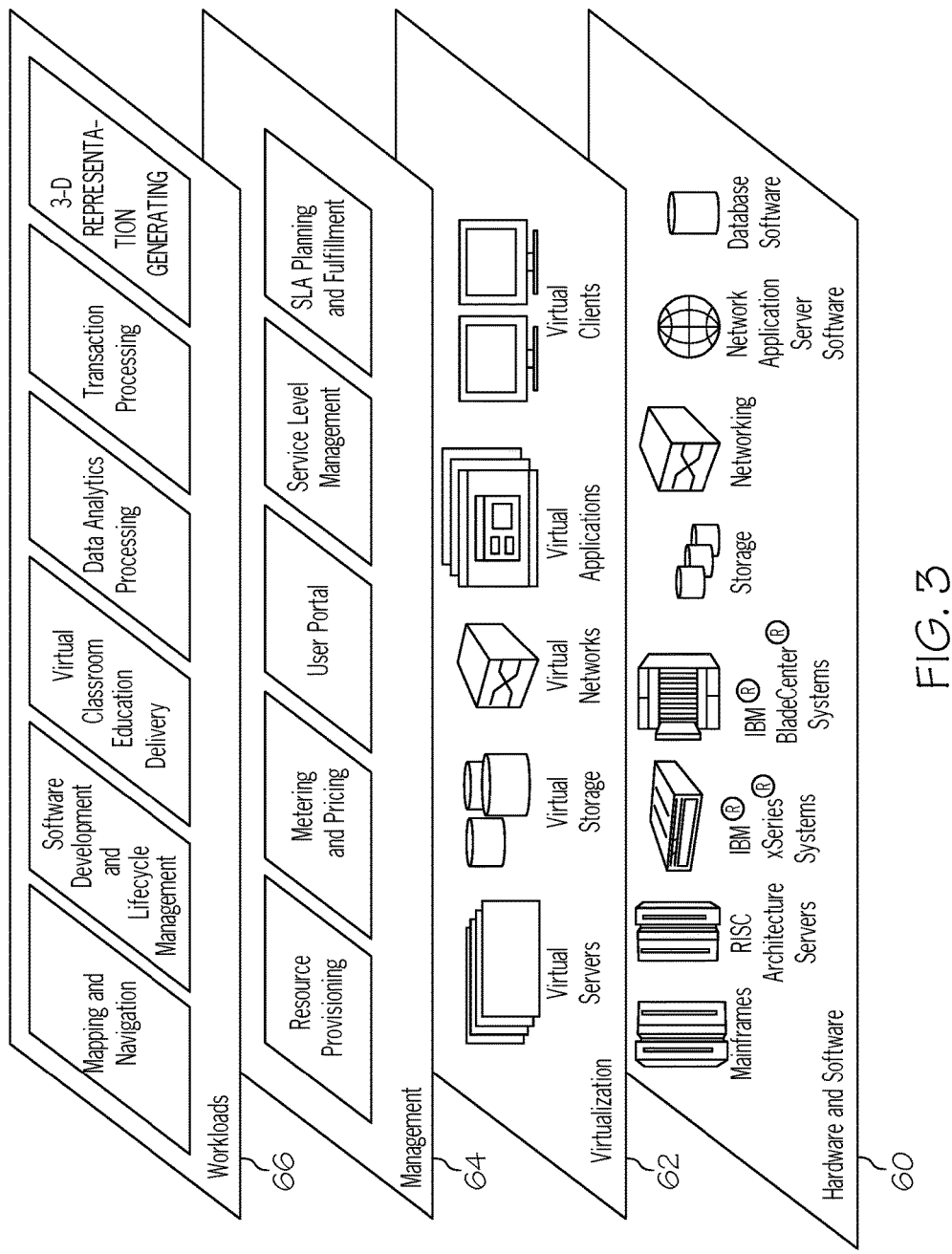
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and generation of three-dimensional representations of physical topographies, as described herein, and as represented by the "3-D Representation Generating" found in workloads layer 66.

With reference now to FIG. 4, there is depicted a block diagram of an exemplary system and network that may be utilized by and/or in the implementation of the present invention, including the architecture used in a three-dimensional topography representation generating hardware device 401. Some or all of the exemplary architecture, including both depicted hardware and software, shown for and within three-dimensional topography representation generating hardware device 401 may be utilized by software deploying server 450 and/or other cloud server(s) 452. In an embodiment, the architecture of software deploying server 450 and/or other cloud server(s) 452 is that of cloud computing node 10 depicted in FIG. 1.

Exemplary three-dimensional topography representation generating hardware device 401 includes a processor 404 that is coupled to a system bus 406. Processor 404 may utilize one or more processors, each of which has one or more processor cores. A video adapter 408, which drives/supports a display 410, is also coupled to system bus 406. System bus 406 is coupled via a bus bridge 412 to an input/output (I/O) bus 414. An I/O interface 416 is coupled to I/O bus 414. I/O interface 416 affords communication with various I/O devices, including a keyboard 418, an altimeter 420, a positioning device 422 (which may include a Global Positioning System (GPS) receiver, an accelerometer, an electronic compass, and/or any other hardware capable of determining a real-time physical location of the three-dimensional topography representation generating hardware device 401), a three-dimensional display 424 (described in various embodiments herein), and external USB port(s) 426. While the format of the ports connected to I/O interface 416 may be any known to those skilled in the art of computer architecture, in one embodiment some or all of these ports are universal serial bus (USB) ports.

As depicted, three-dimensional topography representation generating hardware device 401 is able to communicate with a software deploying server 450 and/or cloud server(s) 452 using a network interface 430. Network interface 430 is a hardware network interface, such as a network interface card (NIC), etc. Network 428 may be an external network such as the Internet, or an internal network such as an Ethernet or a virtual private network (VPN) or a wireless network, such as a cellular phone network. Network 428 can also be accessed by a wireless transceiver 423, assuming that network 428 is a wireless network, or at least has access to a wireless network, such as a cell phone network.

A hard drive interface 432 is also coupled to system bus 406. Hard drive interface 432 interfaces with a hard drive 434, which may be a disk drive or a solid state drive (e.g., "flash" drive). In one embodiment, hard drive 434 populates a system memory 436, which is also coupled to system bus 406. System memory is defined as a lowest level of volatile memory in three-dimensional topography representation generating hardware device 401. This volatile memory includes additional higher levels of volatile memory (not shown), including, but not limited to, cache memory, registers and buffers. Data that populates system memory 436 includes three-dimensional topography representation generating hardware device 401's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. While shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a renderer, shown in exemplary manner as a browser 446. Browser 446 includes program modules and instructions enabling a world wide web (WWW) client (i.e., three-dimensional topography representation generating hardware device 401) to send and receive network messages to the Internet using hypertext transfer protocol (HTTP) messaging, thus enabling communication with software deploying server 450 and other computer systems.

Application programs 444 in three-dimensional topography representation generating hardware device 401's system memory (as well as software deploying server 450's system memory) also include a Three-Dimensional Topography Representation Generating Logic (TDTRGL) 448. TDTRGL 448 includes code for implementing the processes described below, including those described in FIGS. 2-10. In one embodiment, three-dimensional topography representation generating hardware device 401 is able to download TDTRGL 448 from software deploying server 450, including in an on-demand basis, wherein the code in TDTRGL 448 is not downloaded until needed for execution. In one embodiment of the present invention, software deploying server 450 performs all of the functions associated with the present invention (including execution of TDTRGL 448), thus freeing three-dimensional topography representation generating hardware device 401 from having to use its own internal computing resources to execute TDTRGL 448.

In an embodiment of the present invention, also coupled to the I/O interface 416 is a scanner 454 is a photographic device capable of taking a photographic image of a document, and then converting it into a digital file.

The hardware elements depicted in three-dimensional topography representation generating hardware device 401 are not intended to be exhaustive, but rather are representative to highlight essential components required by the present invention. For instance, three-dimensional topography representation generating hardware device 401 may include alternate memory storage devices such as magnetic cassettes, digital versatile disks (DVDs), Bernoulli cartridges, and the like. These and other variations are intended to be within the spirit and scope of the present invention.

With reference now to FIG. 5, an exemplary physical topography is illustrated as being transformed into a two-dimensional topographic map, and then into a three-dimensional representation ("3-D representation") of the original physical topography. Physical topography 502 is a physical landmass, including the depicted hills/mountains, valleys, etc. That is, physical topography 502 is the actual area of land that is represented by a topographic map 504 by contour lines 506, which define the rises and falls in elevation of the physical topography 502. Contour lines 506 that are close together represent steep changes in elevation in the physical topography 502, while contour lines 506 that are farther apart represent more gradual changes in elevation in the physical topography 502.

As described herein, information from the topographic map 504 is used by a three-dimensional topography representation generating hardware device 501 (analogous to the three-dimensional topography representation generating hardware device 401 depicted in FIG. 4) to generate a three-dimensional representation 508 of the physical topography 502. Thus, the three-dimensional representation 508 has the same shape of the physical topography 502, but at a smaller scale than the real physical mountains, valleys, etc. found in the physical topography 502.

In an embodiment of the present invention, the topographic map 504 is a hard copy document (e.g., a topographic map printed on paper), which is scanned (e.g., scanned by the scanner 454 shown in FIG. 4) to create a digital file, which is then used by three-dimensional topography representation generating hardware device 501 to create the three-dimensional representation 508.

In an embodiment of the present invention, the digital file needed by three-dimensional topography representation generating hardware device 501 to create the three-dimensional representation 508 is pre-generated, and is downloaded to the three-dimensional topography representation generating hardware device 501 via a flash drive, a local area network, a cellular phone network, from a "cloud" of computing resources, etc.

With reference now to FIG. 6, additional detail of the three-dimensional topography representation generating hardware device 501 shown in FIG. 5 is illustrated by a side-view of the three-dimensional topography representation generating hardware device 501, in accordance with one or more embodiments of the present invention. As depicted, three-dimensional topography representation generating hardware device 501 includes a matrix (e.g., rows and columns) of movable pins 602, which are supported within a frame 608. When extended to different heights, the movable pins 602 create a three-dimensional surface that defines the three-dimensional representation 508 shown in FIG. 5. That is, each of the movable pins 602 represents a particular locus of the surface of the three-dimensional representation 508 of the physical topography 502 in FIG. 5, such that higher extended movable pins define higher elevations and lower extended movable pins define lower elevations of the physical topography 502.

In one embodiment, the three-dimensional representation 508 is created by the movable pins 602 alone. In another embodiment, the movable pins 602 press against a flexible membrane 604, such that a solid surface is generated. As described herein, in either embodiment the three-dimensional representation 508 is reconfigurable. That is, rather than creating a permanent representation of the physical topography 502 (as in sculpting, 3-D printing, etc.), the present invention creates a dynamic model of the physical topography 502, which can be changed according to various scenarios described herein.

Figure 7B:
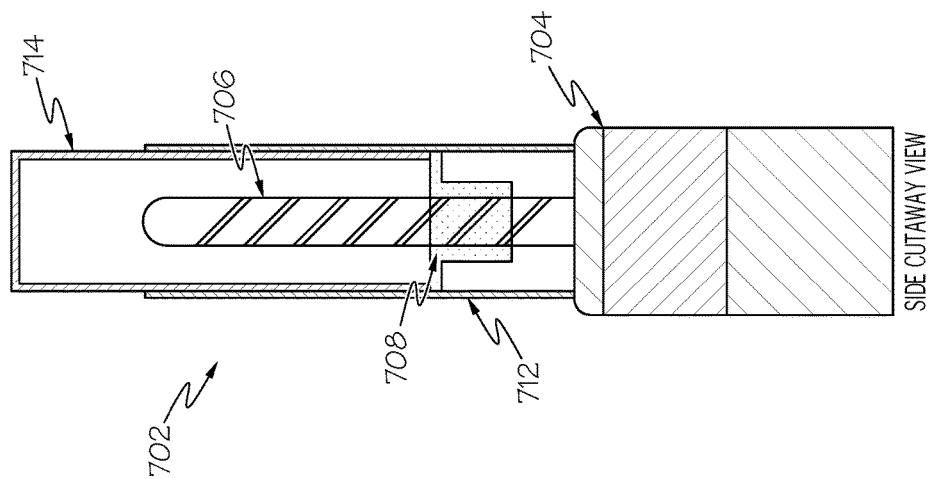
FIGS. 7A-7B depicts an exemplary screw-based infinitely adjustable movable pin in the three-dimensional topography representation generating hardware device illustrated in FIG. 6.
Figure 7A:
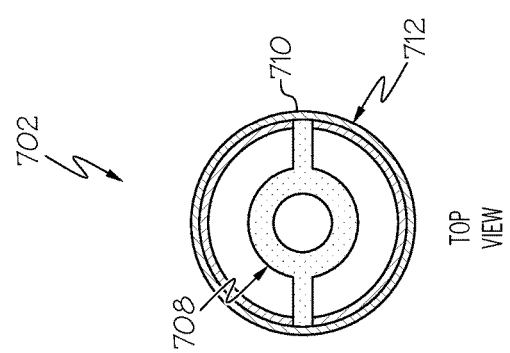
Figure 8:
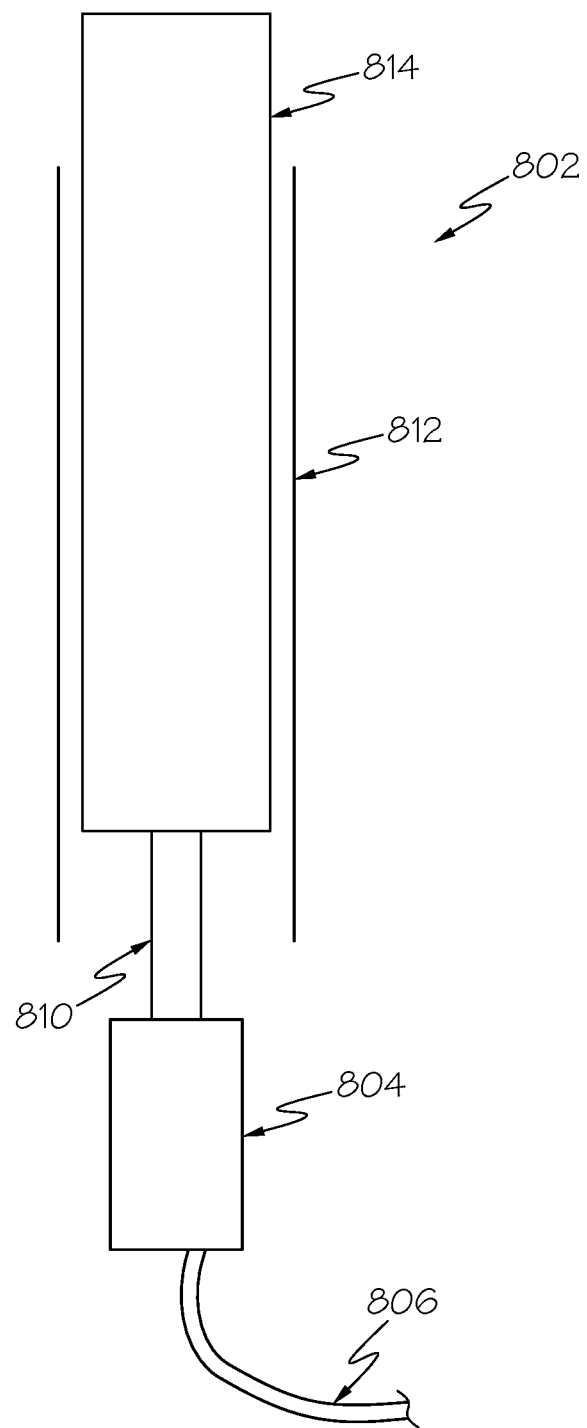
FIG. 8 illustrates an exemplary piston-based infinitely adjustable movable pin in the three-dimensional topography representation generating hardware device illustrated in FIG. 6.

With reference now to FIGS. 7A-7B, additional detail of one of the movable pins 602 shown in FIG. 6 is presented. Depicted movable pin 702 (i.e., one of the movable pins 602 shown in FIG. 6) is a screw-based infinitely adjustable movable pin. An electric motor 704 turns a screw 706 (e.g., a threaded movable spindle). A nut 708, which fits into a slot 710 of a fixed cover 712, is affixed to a sliding tube 714. As the screw 706 turns, the nut 708 and sliding tube 714 move up and down within the fixed cover 712. The position of the sliding tube 714 can be moved to any position desired, and thus is described as being "infinitely adjustable".

While the movable pin 702 in FIGS. 7A-7B depicts a motor-driven screw device, other embodiments of the movable pins 602 in FIG. 6 utilize other configurations. For example, consider the movable pin 802 in FIG. 8, which is a piston-based infinitely adjustable movable pin. As with the movable pin 702 in FIGS. 7A-7B, movable pin 802 has a fixed cover 812 (similar to the fixed cover 712 in FIGS. 7A-7B) within which a sliding tube 814 (similar to the sliding tube 714 in FIG. 7B) can traverse up and down. However, rather than being moved by an electric motor 704, screw 706, and nut 708 (as in FIG. 7B), sliding tube 814 is moved by a piston 804, which pushes and pulls the sliding tube 814 up and down within the fixed cover 812. The piston 804 is powered by a supply line 806.

In an embodiment in which piston 804 is pneumatically driven, supply line 806 is an air hose. That is, air is pumped into the piston 804 to cause the sliding tube 814 to move upwards, and is withdrawn from the piston 804 to pull the sliding tube back down.

In an embodiment in which piston 804 is hydraulically driven, supply line 806 is a fluid hose. That is, liquid is pumped into the piston 804 to cause the sliding tube 814 to move upwards, and is withdrawn from the piston 804 to pull the sliding tube back down.

In an embodiment in which piston 804 is magnetically driven, supply line 806 is an electrical wire. That is, piston 804 includes an internal electromagnet (not shown). As current is passed through the electromagnet, a ferrous rod 810 is forced up or down, depending on the current, thus moving the sliding tube up and down.

Thus, as described herein, the present invention uses an array of movable pins to create, with or without a flexible membrane, a physical representation of a real land topography. FIG. 9 depicts a top view of an exemplary three-dimensional topography representation generating hardware device 901, such as the three-dimensional topography representation generating hardware device 501 illustrated in FIG. 5. As depicted, a three-dimensional display 924 (e.g., 3-D display 424 shown in FIG. 4) includes multiple movable pins (see the side view of three-dimensional topography representation generating hardware device 501 in FIG. 5).

In order to control what 3-D topographic representation is generated on the three-dimensional display 924, various controls are presented on a control pad 902.

For example, assume that a user has turned on the three-dimensional topography representation generating hardware device 901 using the power button 904. A 2-D topographic map may be preloaded within the three-dimensional topography representation generating hardware device 901, or pushing the power button 904 may cause a 2-D topographic map to be downloaded (e.g., using a wireless transceiver such as the wireless transceiver 423 in FIG. 4 to wirelessly communicate with a cloud server 452, in order to download the 2-D topographic map). Alternatively, the user can plug a flash drive into a USB port (e.g., USB port 426 shown in FIG. 4), in order to load the 2-D topographic map into the three-dimensional topography representation generating hardware device 901.

Once the 2-D topographic map is loaded into the three-dimensional topography representation generating hardware device 901, logic within the three-dimensional topography representation generating hardware device 901 generates the 3-D topographic representation by selectively moving the movable pins (e.g., movable pins 602 in FIG. 6), with or without a covering membrane (e.g., flexible membrane 604 in FIG. 6).

Thus, as described herein, a three-dimensional topography representation generating hardware device (e.g., element 401 in FIG. 4) includes a plurality of movable pins (e.g., movable pins 602 in FIG. 6). A converting logic (e.g., processor 404 in FIG. 4) converts a topographic map (e.g., topographic map 504 in FIG. 5) of a first region of a physical topography (e.g., element 502 in FIG. 5) into a set of commands to individually control each of the plurality of movable pins, wherein each of the plurality of movable pins is selectively movable to create a three-dimensional representation of the first region of the physical topography based on the topographic map. That is, the processor 404 reads the information from the 2-D topographic map, and translates that information (e.g., using a lookup table, an conversion algorithm, etc.) into signals that control each of the movable pins.

For example, assume that a 2-D topographic map has a set of contour lines. By measuring how far one contour line in the 2-D topographic map is from another contour line, the distance that a particular set of movable pins must be moved can be calculated. Thus, if two contour lines on the 2-D topographic map are deemed (by the descriptive instructions that map out the 2-D topographic map) to be very close, then movable pins corresponding to the higher-elevation contour line will be moved higher than if two contour lines on the 2-D topographic map are spaced farther apart.

In an embodiment of the present invention, the three-dimensional topography representation generating hardware device also has a flexible membrane (e.g., element 604 in FIG. 6). In this embodiment, the movable pins press against a flexible membrane to create the three-dimensional representation of the first region of the physical topography based on the topographic map. Thus, the flexible membrane provides a uniform surface for the generated three-dimensional representation of the physical topography. As the movable pins are repositioned, the flexible membrane likewise adopts the shape of the movable pins. Therefore, if the movable pins are all retracted to their lowest position, such that the movable pins are no longer pressing against the flexible membrane then, the flexible membrane returns to a planar (i.e., flat) surface.

In an embodiment of the present invention, the three-dimensional topography representation generating hardware device includes a matrix of light emitting devices on the flexible membrane, such that each of the movable pins contacts a different light emitting device from the matrix. For example, assume that the three-dimensional display 924 in FIG. 9 includes a flexible material covering, which is embedded with a matrix of light emitting diodes (LEDs). Assume further that each of the LEDs is in contact with a movable pin (e.g., one of the movable pins 602 shown in FIG. 6). Thus, assuming that the movable pins 602 are capable of receiving and passing an electrical signal, each of the LEDs can be selectively turned on and off. This ability allows the three-dimensional display 924 to provide additional information. Examples of such information include a light pattern, which may depict an optimal pathway for hiking across the depicted physical topography, a location of a destination point on the depicted physical topography, an emergency pathway leading to emergency services in or egress from the depicted physical topography, a current real-time location of the three-dimensional topography representation generating hardware device (and thus the user), etc. All such information is created by a light signal generator (e.g., processor 404 in FIG. 4) that transmits a signal from one or more of the movable pins to corresponding one or more of the light emitting devices in the flexible membrane to create the desired light pattern on the flexible membrane.

In an embodiment of the present invention, the matrix of light emitting devices on the flexible membrane may be an illumination of all of the LED's, thus causing the 3-D representation to be illuminated (e.g., at night). This is accomplished by the user pressing the light button 914 shown in FIG. 9, which signals the system to provide (via the movable pins) power to all of the LEDs in the flexible membrane.

In an embodiment of the present invention, the three-dimensional topography representation generating hardware device 401 also includes a zoom-in receiver (e.g., processor 404 in FIG. 4) for receiving a zoom-in signal. This zoom-in signal (generated by pushing the zoom in button 906 in FIG. 9) defines a portion of the physical topography. That is, by zooming in on a portion (e.g., a smaller area) of the three-dimensional topography representation, the zoom-in signal causes a regeneration of the three-dimensional representation of the physical topography into a three-dimensional representation of the portion of the first region of the physical topography based on the zoom-in signal. Thus, by zooming in, a smaller area is represented by the three-dimensional topography representation, but with greater definition and granularity. In an embodiment, the zooming in actually is read by the processor 404 as zooming in on the 2-D topographic map. The zoomed in area is identified, and the new three-dimensional topographic representation is altered accordingly.

Similarly, if the user zooms out of the 2-D/3-D map/representation (e.g., by pressing the button 908 in FIG. 9, then a wider area of the topography will be represented by the 2-D/3-D map/representation. This results in a new 3-D representation that includes an extended area that includes the first region of the physical topography and an area surrounding the first region of the physical topography, thereby resulting in a regeneration of the three-dimensional representation of the first region of the physical topography into a three-dimensional representation of the extended area of the physical topography based on the zoom-out signal.

In an embodiment of the present invention, the three-dimensional topography representation generating hardware device 401 also includes a movement detector. The movement detector (e.g., positioning device 422 in FIG. 4) may include a GPS sensor, an accelerometer, and/or other hardware devices that determine any change in location of the three-dimensional topography representation generating hardware device. Thus, when the three-dimensional topography representation generating hardware device moves from a first location to a second location within the physical topography that is being mapped/represented, then a new three-dimensional representation is generated. That is, as a user of the three-dimensional topography representation generating hardware device walks through the physical topography, the user presses the current location button 910 show in FIG. 9, thus causing the 3-D representation of the physical topography changes as well, thus giving the user a real-time representation of the physical topography around the user at all times.

In an embodiment of the present invention, the three-dimensional topography representation generating hardware device includes a positioning device (e.g., positioning device 422 in FIG. 4). The positioning device identifies a current location of the three-dimensional topography representation generating hardware device (and thus where the user is in real time). A visual cue generator (e.g., processor 404 in FIG. 4) generates a visual cue on the three-dimensional representation of the first region of the physical topography, wherein the visual cue identifies the current location of the three-dimensional topography representation generating hardware device. That is, as the user is walking through the physical topography, his/her current location is marked on the 3-D representation by a color coded LED in the flexible material described herein. Alternatively, if there is not a flexible material being used (rather only movable pins), then the user's current location may be identified a movable pin that sticks up higher than any other movable pin on the 3-D representation.

In an embodiment of the present invention, the three-dimensional topography representation generating hardware device also includes a predefined location identifier (e.g., processor 404 in FIG. 4) for identifying a predefined location on the three-dimensional representation of the first region of the physical topography. For example, assume that a hiker wants to climb to the summit of a mountain. The hiker will press the fixed location button 912 shown in FIG. 9, indicating that the hiker wants to go to a pre-programmed location. However, "false summits" often occur, in which the climber thinks he/she is at the summit, but the true summit is actually a few meters or a few hundred meters farther up the mountain. In this embodiment, a visual cue generator (e.g., processor 404), using readings from the positioning device 422 in FIG. 4, will generate a visual cue on the three-dimensional representation of the first region of the physical topography, wherein the visual cue identifies the predefined location on the three-dimensional representation of the first region of the physical topography. The visual cue may be from an LED in the flexible membrane described herein, or it may be a particular movable pin sticking up higher than all other movable pins (even if the flexible membrane is not part of the system). Thus, the visual cue may 1) identify the true summit on 3-D representation, and/or 2) give a visual cue when the climber has actually reached the true summit.

In an embodiment of the present invention, the three-dimensional topography representation generating hardware device includes an altimeter (e.g., element 420 in FIG. 4) for identifying the three-dimensional topography representation generating hardware device reaching a desired predetermined altitude (e.g., an apex/summit of a mountain) of the physical topography. Thus, the device is specific for summits, not just any predefined location. In response to the climber reaching the summit, a visual cue generator (e.g., processor 404 in FIG. 4) generates a visual cue, on the three-dimensional representation of the first region of the physical topography, in response to the three-dimensional topography representation generating hardware device physically being located at the apex of the first region of the physical topography.

Figure 10:
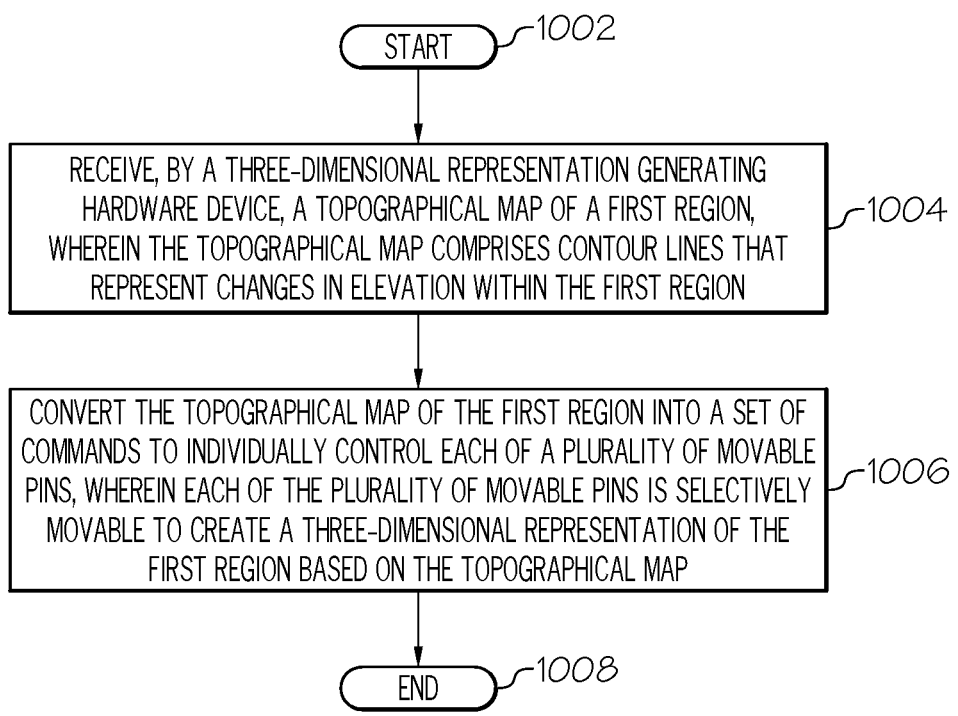
FIG. 10 is a high level flow-chart of one or more operations performed by one or more processors or other hardware devices to generate a three-dimensional representation of a physical topography in accordance with one or more embodiments of the present invention.

With reference now to FIG. 10, a high level flow-chart of one or more operations performed by one or more processors or other hardware devices to generate a three-dimensional representation of a physical topography in accordance with one or more embodiments of the present invention is presented. After initiator block 1002, a three-dimensional topography representation generating hardware device receives a topographic map of a first region of a physical topography, wherein the topographic map comprises contour lines that represent changes in elevation within the first region of the physical topography (block 1004). As described herein, this topographic map is a 2-D map, and may be received wirelessly, be preloaded into the three-dimensional topography representation generating hardware device, be loaded from a flash drive, etc.

As described in block 1006, one or more processors then convert the topographic map of the first region of the physical topography into a set of commands to individually control each of a plurality of movable pins, wherein each of the plurality of movable pins is selectively movable to create a three-dimensional representation of the first region of the physical topography based on the topographic map.

The flow-chart ends at terminator block 1008.

In an embodiment of the present invention, the plurality of movable pins press against a flexible membrane to create the three-dimensional representation of the first region of the physical topography based on the topographic map, wherein the flexible membrane is returnable to a planar shape in response to the plurality of movable pins no longer pressing against the flexible membrane.

In an embodiment of the present invention, the flexible membrane comprises a matrix of light emitting devices, wherein each of the movable pins contacts a different light emitting device from the matrix. In such an embodiment, the method further comprises transmitting, within the three-dimensional topography representation generating hardware device, a signal from one or more of the movable pins to corresponding one or more of the light emitting devices in the flexible membrane to create a light pattern on the flexible membrane.

In an embodiment of the present invention, the three-dimensional topography representation generating hardware device receives a zoom-in signal, wherein the zoom-in signal defines a portion of the first region of the physical topography. One or more processors then regenerate the three-dimensional representation of the first region of the physical topography into a three-dimensional representation of the portion of the first region of the physical topography based on the zoom-in signal.

In an embodiment of the present invention, the three-dimensional topography representation generating hardware device receives a zoom-out signal, wherein the zoom-out signal defines an extended area that includes the first region of the physical topography and an area surrounding the first region of the physical topography. The three-dimensional topography representation generating hardware device then regenerates the three-dimensional representation of the first region of the physical topography into a three-dimensional representation of the extended area based on the zoom-out signal.

In an embodiment of the present invention, a movement detection hardware device detects movement of the three-dimensional topography representation generating hardware device from one location in the first region of the physical topography to a second location in a second region of the physical topography. One or more processors then regenerate the three-dimensional representation of the first region of the physical topography into a three-dimensional representation of the second region of the physical topography based on the movement of the three-dimensional topography representation generating hardware device from the first location in the first region of the physical topography to the second location in the second region of the physical topography. That is, as the user moves (e.g., hikes, walks, runs, drives, etc.) across the terrain/topography, the 3-D representation changes accordingly.

In an embodiment of the present invention, a location identification hardware device identifies a current location of the three-dimensional topography representation generating hardware device. One or more processors then generate a visual cue on the three-dimensional representation of the first region of the physical topography, wherein the visual cue identifies the current location of the three-dimensional topography representation generating hardware device.

In an embodiment of the present invention, one or more processors identify a predefined location on the three-dimensional representation of the first region of the physical topography. One or more processors then generate a visual cue on the three-dimensional representation of the first region of the physical topography, wherein the visual cue identifies the predefined location on the three-dimensional representation of the first region of the physical topography.

In an embodiment of the present invention, one or more processors identify an apex of the first region of the physical topography. One or more processors then scale the three-dimensional representation of the first region of the physical topography based on the apex. That is, in an embodiment, the amount of movement of the movable pins depends on the elevation difference in the region that is being mapped/represented. For example, if the 3-D representation models a mountain from its base to its summit, and the rise in elevation from the base to the summit is 1,000 meters, then each increase of 10 meters of elevation represented by the 3-D representation will be represented by a movement the movable pins of "X millimeters". However, if the rise in elevation from the base to the summit is 100 meters, then each increase of 10 meters of elevation represented by the 3-D representation will be represented by a movement the movable pins of "10X millimeters". That is, a higher mountain will be depicted with a lower level of resolution by the movable pins ("X" millimeters of movable pin movement depicting each 10 meters of physical elevation change to the real topography) than a lower mountain ("10X" millimeters of movable pin movement depicting each 10 meters of physical elevation change to the real topography).

Just as elevation is scaled, other features are likewise scaled for granularity in various embodiments. That is, assume that the 3-D representation is of an area that is 10 kilometers×10 kilometers. In this scenario, a matrix of 100 movable pins would force each movable pin to represent 1 square kilometer. However, if the 3-D representation is of an area that is 10 meters×10 meters, then each movable pin from the matrix of 100 movable pins would represent 1 square meter, which is obviously a much higher resolution.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A three-dimensional topography representation generating hardware device, comprising:
   a frame;
   a plurality of movable pins within the frame;
   a converting logic for converting a topographic map of a first region of a physical topography into a set of commands to individually control each of the plurality of movable pins, wherein each of the plurality of movable pins is selectively movable based on distances between contour lines in the topographic map in order to create a three-dimensional representation of the first region of the physical topography based on the topographic map;
   a positioning device, wherein the positioning device identifies a current location of the three-dimensional topography representation generating hardware device; and
   a visual cue generator for generating a visual cue on the three-dimensional representation of the first region of the physical topography, wherein the visual cue identifies the current location of the three-dimensional topography representation generating hardware device, wherein the visual cue is generated by a light emitting diode (LED) that is in contact with a particular movable pin that identifies the current location of the three-dimensional topography representation generating hardware device, and wherein the particular movable pin is from the plurality of movable pins.

2. The three-dimensional topography representation generating hardware device of claim 1, further comprising:
   a zoom-in receiver for receiving a zoom-in signal, wherein the zoom-in signal defines a portion of the first region of the physical topography, and wherein the zoom-in signal causes a regeneration of the three-dimensional representation of the first region of the physical topography into a three-dimensional representation of the portion of the first region of the physical topography based on the zoom-in signal.

3. The three-dimensional topography representation generating hardware device of claim 1, further comprising:
   a zoom-out receiver for receiving a zoom-out signal, wherein the zoom-out signal defines an extended area that includes the first region of the physical topography and an area surrounding the first region of the physical topography, and wherein the zoom-out signal causes a regeneration of the three-dimensional representation of the first region of the physical topography into a three-dimensional representation of the extended area of the physical topography based on the zoom-out signal.

4. The three-dimensional topography representation generating hardware device of claim 1, further comprising:
   a movement detector, wherein the movement detector detects movement of the three-dimensional topography representation generating hardware device from a first location in the first region of the physical topography to a second location in a second region of the physical topography, and wherein the movement causes a regeneration of the three-dimensional representation of the first region of the physical topography into a three-dimensional representation of the second region of the physical topography based on the movement of the three-dimensional topography representation generating hardware device from the first location in the first region of the physical topography to the second location in the second region of the physical topography.

5. The three-dimensional topography representation generating hardware device of claim 1, further comprising:
  a predefined location identifier for identifying a predefined location on the three-dimensional representation of the first region of the physical topography; and
  a visual cue generator for generating a visual cue on the three-dimensional representation of the first region of the physical topography, wherein the visual cue identifies the predefined location on the three-dimensional representation of the first region of the physical topography.

6. The three-dimensional topography representation generating hardware device of claim 1, further comprising:
  an altimeter for identifying the three-dimensional topography representation generating hardware device reaching a predetermined altitude of the first region of the physical topography; and
  a visual cue generator for generating a visual cue, on the three-dimensional representation of the first region of the physical topography, in response to the three-dimensional topography representation generating hardware device physically being located at the predetermined altitude of the first region of the physical topography.

7. A method for generating a three-dimensional representation of a topographic map, the method comprising:
  receiving, by a three-dimensional topography representation generating hardware device, a topographic map of a first region of a physical topography, wherein the topographic map comprises contour lines that represent changes in elevation within the first region of the physical topography;
  converting, by one or more processors, the topographic map of the first region of the physical topography into a set of commands to individually control each of a plurality of movable pins within a frame, wherein each of the plurality of movable pins is selectively movable to create a three-dimensional representation of the first region of the physical topography based on the topographic map;
  identifying, by one or more processors, a predefined location on the three dimensional representation of the first region of the physical topography; and
  generating, by one or more processors, a visual cue on the three-dimensional representation of the first region of the physical topography, wherein the visual cue identifies the predefined location on the three-dimensional representation of the first region of the physical topography, wherein the visual cue is generated by a light emitting diode (LED) that is in contact with a particular movable pin that identifies the predefined location on the three-dimensional representation of the first region of the physical topography, and wherein the particular movable pin is from the plurality of movable pins.

8. The method of claim 7, wherein the plurality of movable pins press against a flexible membrane to create the three-dimensional representation of the first region of the physical topography based on the topographic map, and wherein the flexible membrane is returnable to a planar shape in response to the plurality of movable pins no longer pressing against the flexible membrane.

9. The method of claim 8, wherein the flexible membrane comprises a matrix of light emitting devices, wherein each of the movable pins contacts a different light emitting device from the matrix, and wherein the method further comprises:
  transmitting, within the three-dimensional topography representation generating hardware device, a signal from one or more of the movable pins to a corresponding one or more of the light emitting devices in the flexible membrane to create a light pattern on the flexible membrane.

10. The method of claim 7, further comprising:
  receiving, by the three-dimensional topography representation generating hardware device, a zoom-in signal, wherein the zoom-in signal defines a portion of the first region of the physical topography; and
  regenerating, by one or more processors, the three-dimensional representation of the first region of the physical topography into a three-dimensional representation of the portion of the first region of the physical topography based on the zoom-in signal.

11. The method of claim 7, further comprising:
  receiving, by the three-dimensional topography representation generating hardware device, a zoom-out signal, wherein the zoom-out signal defines an extended area that includes the first region of the physical topography and an area surrounding the first region of the physical topography; and
  regenerating, by the three-dimensional topography representation generating hardware device, the three-dimensional representation of the first region of the physical topography into a three-dimensional representation of the extended area based on the zoom-out signal.

12. The method of claim 7, further comprising:
  detecting, by a movement detection hardware device, movement of the three-dimensional topography representation generating hardware device from a first location in the first region of the physical topography to a second location in a second region of the physical topography; and
  regenerating, by one or more processors, the three-dimensional representation of the first region of the physical topography into a three-dimensional representation of the second region of the physical topography based on the movement of the three-dimensional topography representation generating hardware device from the first location in the first region of the physical topography to the second location in the second region of the physical topography.

13. The method of claim 7, further comprising:
  identifying, by a location identification hardware device, a current location of the three-dimensional topography representation generating hardware device; and
  generating, by one or more processors, a visual cue on the three-dimensional representation of the first region of the physical topography, wherein the visual cue identifies the current location of the three-dimensional topography representation generating hardware device.

14. A computer program product for generating a three-dimensional representation of a physical topography based on a topographic map of the physical topography, wherein the computer program product comprises a computer readable storage medium having program code embodied therewith, wherein the computer readable storage medium is not a transitory signal per se, and wherein the program code is readable and executable by a processor to perform a method comprising:

receiving a topographic map of a first region of the physical topography, wherein the topographic map comprises contour lines that represent changes in elevation within the first region of the physical topography;

converting the topographic map of the first region of the physical topography into a set of commands to individually control each of a plurality of movable pins within a frame, wherein each of the plurality of movable pins is selectively movable to create a three-dimensional representation of the first region of the physical topography based on the topographic map;

identifying a current location of the three-dimensional topography representation generating hardware device; and generating a visual cue on the three-dimensional representation of the first region of the physical topography, wherein the visual cue identifies the current location of the three-dimensional topography representation generating hardware device, wherein the visual cue is generated by a light emitting diode (LED) that is in contact with a particular movable pin that identifies the current location of the three-dimensional topography representation generating hardware device, and wherein the particular movable pin is from the plurality of movable pins.

15. The computer program product of claim 14, wherein the plurality of movable pins press against a flexible membrane to create the three-dimensional representation of the first region of the physical topography based on the topographic map, and wherein the flexible membrane is returnable to a planar shape in response to the plurality of movable pins no longer pressing against the flexible membrane.

16. The computer program product of claim 15, wherein the flexible membrane comprises a matrix of light emitting devices, wherein each of the movable pins contacts a different light emitting device from the matrix, and wherein the method further comprises:

transmitting a signal from one or more of the movable pins to a corresponding one or more of the light emitting devices in the flexible membrane to create a light pattern on the flexible membrane.

17. The computer program product of claim 14, wherein the method further comprises:

receiving a zoom-in signal, wherein the zoom-in signal defines a portion of the first region of the physical topography; and regenerating the three-dimensional representation of the first region of the physical topography into a three-dimensional representation of the portion of the first region of the physical topography based on the zoom-in signal.

18. The computer program product of claim 14, wherein the method further comprises:

receiving a zoom-out signal, wherein the zoom-out signal defines an extended area that includes the first region of the physical topography and an area surrounding the first region of the physical topography; and regenerating the three-dimensional representation of the first region of the physical topography into a three-dimensional representation of the extended area based on the zoom-out signal.

19. The computer program product of claim 14, wherein the method further comprises:

detecting movement of the three-dimensional topography representation generating hardware device from a first location in the first region of the physical topography to a second location in a second region of the physical topography; and regenerating the three-dimensional representation of the first region of the physical topography into a three-dimensional representation of the second region of the physical topography based on the movement of the three-dimensional topography representation generating hardware device from the first location in the first region of the physical topography.

\* \* \* \* \*